United States Patent [19]

Sugano

[11] Patent Number: 4,984,664
[45] Date of Patent: Jan. 15, 1991

[54] HYDRAULIC SYSTEM FOR TORQUE CONVERTER WITH LOCK-UP CLUTCH

[75] Inventor: Kazuhiko Sugano, Yokohama, Japan
[73] Assignee: Nissan Motor Co., Ltd., Yokohama, Japan
[21] Appl. No.: 264,718
[22] Filed: Oct. 31, 1988
[30] Foreign Application Priority Data
    Oct. 30, 1987 [JP] Japan ................ 62-273231
[51] Int. Cl.⁵ ........................... F16H 45/02
[52] U.S. Cl. .................... 192/3.3; 192/3.29
[58] Field of Search ............ 192/3.3, 3.29, 3.28

[56] References Cited

U.S. PATENT DOCUMENTS

| 2,675,102 | 4/1954 | Robinson | 192/3.3 X |
| 3,497,043 | 2/1970 | Leonard | 192/3.3 X |
| 4,294,140 | 10/1981 | Iwanaga et al. | 192/3.3 X |
| 4,570,770 | 2/1986 | Nishikawa et al. | 192/3.3 X |
| 4,660,693 | 4/1987 | Taga et al. | 192/3.3 X |
| 4,768,635 | 9/1988 | Sakurai et al. | 192/3.3 X |

FOREIGN PATENT DOCUMENTS

| 0094667 | 6/1983 | Japan | 192/3.29 |
| 0126156 | 7/1984 | Japan | 192/3.29 |
| 0056662 | 3/1987 | Japan | 192/3.3 |

OTHER PUBLICATIONS

Toyota Vista E-SV10 Series, A/T Mounted Car, New Car Introduction Manual, Jul., 1982, pp. 11–12.

*Primary Examiner*—Richard Lorence
*Attorney, Agent, or Firm*—Foley & Lardner, Schwartz, Jeffery, Schwaab, Mack, Blumenthal & Evans

[57] ABSTRACT

In order to increase a torque transmission capacity of a lock-up clutch without any increase in the internal pressure of a torque converter, a lock-up clutch release circuit and a lock-up clutch engagement circuit share a primary relief valve, and the lock-up release circuit is further provided with a secondary relief valve disposed between a lock-up control valve and the torque converter. Thus, when the lock-up clutch engagement circuit is opened, the primary relief valve works to prevent the pressure of hydraulic fluid from increasing above a first predetermined value, whereas, when the lock-up clutch release circuit is opened, the secondary relief valve causes a drop in the hydraulic pressure and prevents the hydraulic pressure from increasing above a second predetermined value. The first predetermined value is higher than the second predtermined value.

4 Claims, 4 Drawing Sheets

FIG. 3

| | | R/C | H/C | F/C | O/C | B/B 2A | B/B 3R | B/B 4A | L&R/B | F/O | L/O | GEAR RATIO | $\alpha_1 = 0.45$ $\alpha_2 = 0.45$ |
|---|---|---|---|---|---|---|---|---|---|---|---|---|---|
| D RANGE | ENGINE DRIVING 1ST | | | ○ | | | | | | ○ | ○ | $\dfrac{1+\alpha_1}{\alpha_1}$ | 3.22 |
| | 2ND | | ○ | ○ | | | ○ | | | ○ | | $\dfrac{\alpha_1+\alpha_2+\alpha_1\alpha_2}{\alpha_1(1+\alpha_2)}$ | 1.69 |
| | 3RD | | ○ | ○ | ○ | ○ | | | | ○ | | 1 | 1 |
| | 4TH | | | (○) | ○ | | | ○ | | | | $\dfrac{1}{1+\alpha_2}$ | 0.69 |
| | ENGINE BRAKING 1ST | | | (○) | | ○ | ○ | | | | | | |
| | 2ND | | ○ | (○) | | | ○ | | | | | | |
| | 3RD | | ○ | (○) | ○ | ○ | | | | | | | |
| | 4TH | | | (○) | ○ | | | ○ | | | | | |
| 2ND RANGE | 1ST | | | ○ | | | | | | ○ | ○ | | |
| | 2ND | | | ○ | | ○ | | | | ○ | | | |
| 1ST RANGE | 1ST | | | ○ | | | ○ | | ○ | ○ | | | |
| REVERSE | | ○ | | | | | | | ○ | ○ | | $-\dfrac{1}{\alpha_2}$ | -2.22 |

( ) UNRELATED TO POWER TRANSMISSION

HYDRAULIC SYSTEM FOR TORQUE CONVERTER WITH LOCK-UP CLUTCH

BACKGROUND OF THE INVENTION

The present invention relates to a hydraulic system for a torque converter with a lock-up clutch.

A known hydraulic system for a torque converter with a lock-up clutch is illustrated on page 33 of a publication entitled "TOYOTA VISTA E-SV10 SERIES A/T MOUNTED CAR, NEW CAR INTRODUCTION MANUAL, JUL. 1982." In this known system, the lock-up clutch extends inside the converter chamber and defines on one side an apply chamber and on the opposite side a release chamber. A lock-up control valve is disposed between a pressure regulator valve and the torque converter to allow supply of hydraulic fluid to the release chamber and discharge of hydraulic fluid from the apply chamber in response to the absence of a lock-up, clutch engagement demand. In the presence of the lock-up clutch engagement demand, the lock-up control valve switches to allow supply of hydraulic fluid to the apply chamber and discharge of hydraulic fluid from the release chamber. In the former case, the lock-up clutch is released, while in the latter case the lock-up clutch is engaged. In order to keep hydraulic fluid pressure within the torque converter low enough in view of the structural rigidity of the torque converter, a pressure relief valve is provided between the pressure regulator valve and the lock-up control valve. With this pressure relief valve, the pressure of hydraulic fluid supplied to the torque converter via the lock-up control valve is prevented from increasing above a predetermined value. This means that the hydraulic fluid pressure within the torque converter remains unchanged regardless of whether the lock-up clutch is engaged or released.

In this known hydraulic system, since there is a limit to hydraulic fluid pressure allowed to be increased within the torque converter, the torque transmission capacity of the lock-up clutch is determined by this hydraulic fluid pressure within the torque converter. Thus, the torque transmission capacity of the lock-up clutch cannot be increased even if it is desired to increase torque transmission capacity. A conventional approach to this problem has been to use a torque converter with an increased diameter which allows the provision of a lock-up clutch having an increased frictional area.

An object of the present invention is to solve the above-mentioned problem without increasing the size or structural rigidity of a torque converter.

A specific object of the present invention is to improve a hydraulic system for a torque converter with a lock-up clutch such that, without any substantial change in the component parts, the torque transmission capacity of the lock-up clutch is increased.

Another object of the present invention is to provide a hydraulic control system for a torque converter with a lock-up clutch which can be adjusted to an engine capable of producing a large torque without any substantial change in component parts.

SUMMARY OF THE INVENTION

The present invention has been elaborated on the recognition that the structural rigidity of a torque converter against internal pressure is increased when a lock-up clutch is engaged.

According to the present invention, there is provided a hydraulic system for a torque converter with a lock-up clutch. The hydraulic control system comprises:

a lock-up clutch release circuit which is opened in response to an absence of a lock-up clutch engagement demand, allowing supply of hydraulic fluid to the release chamber within the torque converter and discharge of hydraulic fluid from the apply chamber within the torque converter;

a lock-up clutch engagement circuit which is opened in response to the lock-up clutch engagement demand, allowing supply of hydraulic fluid to the apply chamber within the torque converter and discharge of hydraulic fluid from the release chamber;

a first relief valve disposed in said lock-up clutch engagement circuit to prevent the pressure of the hydraulic fluid therein from increasing above a first predetermined value; and a second relief valve disposed in said lock-up clutch release circuit to prevent the pressure of the hydraulic fluid therein from increasing above a second predetermined value;

the setting being such that said first predetermined value is higher than said second predetermined value.

More specifically, the lock up clutch release circuit and said lock-up clutch engagement circuit share said first relief valve, whereby when the lock-up clutch release circuit is opened, the hydraulic fluid pressure drops to said first predetermined value owing to the first relief valve and then further drops to said second predetermined value owing to the second relief valve.

In one form of the present invention, there is provided a hydraulic control system for an automatic transmission drivingly connected to a torque converter with a lock-up clutch therein, the lock-up clutch defining an apply chamber and a release chamber within the torque converter. The hydraulic control system comprises:

a lock-up clutch release circuit including a pressure regulator valve, a lock-up control valve, and the torque converter, the lock-up clutch release circuit being opened in response to the absence of a lock-up clutch engagement demand, allowing supply of hydraulic fluid from the pressure regulator valve to the release chamber within the torque converter via the lock-up control valve and discharge of hydraulic fluid from the apply chamber within the torque converter;

a lock-up clutch engagement circuit including the pressure regulator valve, the lock-up control valve, and the torque converter, the lock-up clutch engagement circuit being opened in response to the presence of said lock-up clutch engagement demand, allowing supply of hydraulic fluid from the pressure regulator valve to the apply chamber within the torque converter via the lock-up control valve and discharge of hydraulic fluid from the release chamber within the torque converter;

a primary relief valve disposed in said lock-up release and engagement circuits between the pressure regulator valve and the lock-up control valve; and a secondary relief valve disposed in the lock-up clutch release circuit between the lock-up control valve and the torque converter.

BRIEF DESCRIPTION OF THE DRAWINGS

FIG. 3 is a table showing a shift schedule of the automatic transmission; and

DETAILED DESCRIPTION OF THE INVENTION

Figure 2:
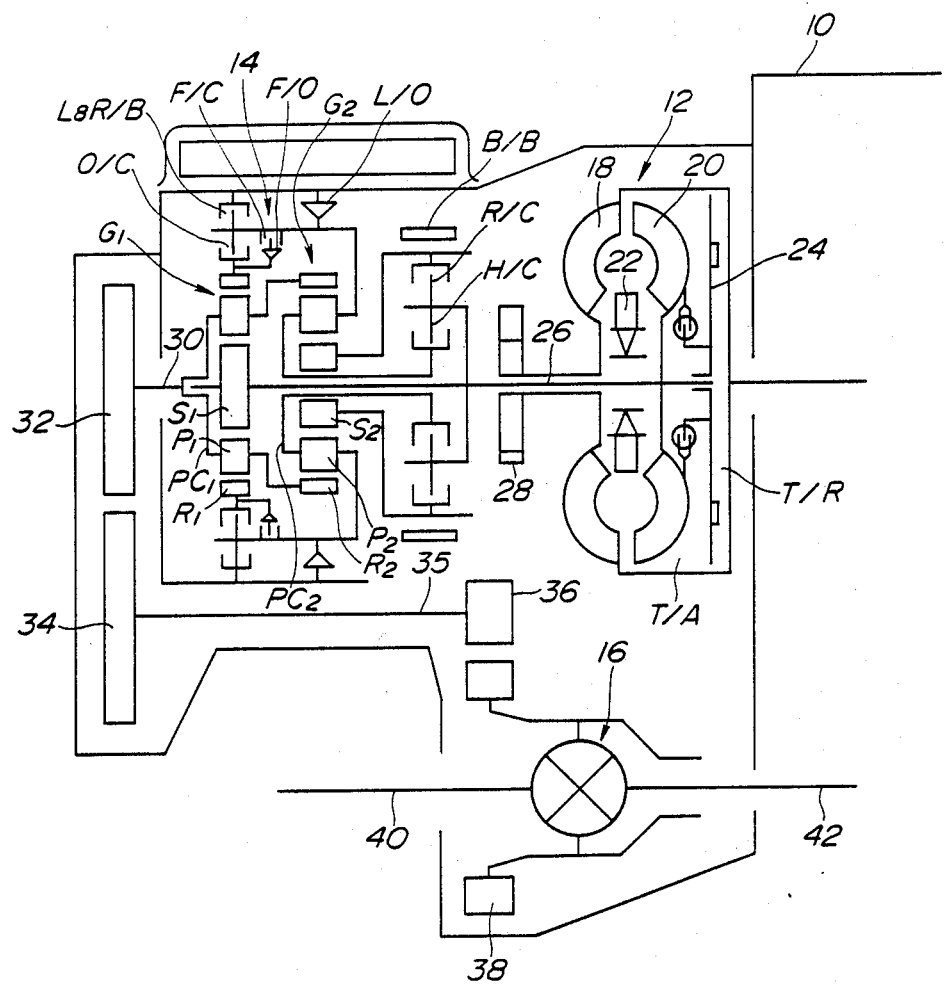
FIG. 2 is a diagram line of a power train of a transaxle in the automatic transmission.

Referring to FIG. 2, there is shown a diagram line of an automatic transmission (automatic transaxle). That is, the reference numeral 10 designates an engine which is suitable for transverse mount with regard to the longitudinal direction of a vehicle. Torque of the engine is supplied to a torque converter 12 on a pump impeller 18 thereof. In addition to the torque converter 12, the automatic transmission comprises a change speed planetary gear box 14, and a differential unit 16. In addition to the pump impeller 18, the torque converter 12 includes a turbine runner 20 and a stator 22. It also includes a lock-up clutch 24 for establishing a mechanical drive connection between the pump impeller 18 and turbine runner 20. When the lock-up clutch 24 is disengaged or released, torque is transmitted via hydraulic fluid from the pump impeller 18 to the turbine runner 20 and then to a transmission input shaft 26 drivingly connected to the turbine runner 20. When the lock-up clutch 24 is engaged, the torque is transmitted via a mechanical connection between the pump impeller 18 and turbine runner 20 to the input shaft 26. The lock-up clutch 24 is activated in response to a pressure differential between an apply chamber T/A and a release chamber T/R. The pump impeller 18 is drivingly connected to an oil pump 28 so that the engine drives the oil pump 28.

The change speed planetary gear box 14 comprises a first planetary gear set $G_1$ and a second planetary gear set $G_2$. The first planetary gear set $G_1$ includes a first sun gear $S_1$, a first internal or ring gear $R_1$, and a first planet pinion carrier $PC_1$. The first planet pinion carrier $PC_1$ rotatably supports at least one planet pinion $P_1$ meshing with the sun and ring gears $S_1$ and $R_1$. The second planetary gear set $G_2$ comprises a second sun gear $S_2$, a second internal or ring gear $R_2$, and a second planet pinion carrier $PC_2$. The second planet pinion carrier $PC_2$ rotatably supports at least one planet pinion $P_2$ meshing with the second sun and ring gears $S_2$ and $R_2$. The first sun gear $S_1$ is drivingly connected to the input shaft 26, while the first pinion carrier $PC_1$ and second ring gear $R_2$ are connected to a transmission output shaft 30.

Via a serially connected forward one-way clutch F/O and forward clutch F/C, the first ring gear $R_1$ is drivingly connectable to the second pinion carrier $PC_2$. An overrun clutch O/C is arranged in parallel to the serially connected forward one-way clutch F/O and forward clutch F/C. Via this overrun clutch O/C, the first ring gear $R_1$ is drivingly connectable to the second pinion carrier $PC_2$. The second sun gear $S_2$ is drivingly connectable via a reverse clutch R/C to the input shaft 26. The second pinion carrier $PC_2$ is drivingly connectable via a high clutch H/C to the input shaft 26. The second sun gear $S_2$ is adapted to be held stationary relative to a transmission casing via a band brake B/B. The second pinion carrier $PC_2$ is adapted to be held stationary relative to the casing via a low one-way clutch L/O or a low & reverse brake L&R/B which is arranged in parallel to the low one-way clutch L/O. The output shaft 30 has an output gear 32 rotatable therewith. An idler shaft 35 is rotatably mounted in the transmission casing and extends in parallel to the output shaft 30. An idler gear 34 is connected to the idler shaft 35 for rotation therewith at one end portion thereof. At the opposite end portion, the idler shaft 35 has a reduction gear 36 for rotation therewith. The idler gear 34 is in mesh with the output gear 32, while the reduction gear 36 is in mesh with a ring gear 38 of the differential unit 16. The differential unit 16 has drive axles 40 and 42 extending outward in the opposite directions. These drive axles 40 and 42 are drivingly connected to a left front wheel and a right front wheel, respectively.

In the change speed planetary gear box 14, varying a selected one or a selected combination of the clutches F/C, H/C, O/C, and R/C, the brakes B/B and L&R/B, and the one-way clutches F/O and L/O which are to be activated or engaged will cause a shift in the rotating state of planetary gear elements $S_1$, $S_2$, $R_1$, $R_2$, $PC_1$, and $PC_2$ of the planetary gear sets $G_1$ and $G_2$, causing a change in the rotational speed of the output shaft 30 relative to the rotational speed of the input shaft 26. More specifically, activating one of or a combination of the clutches, brakes, and one-way clutches in a schedule as illustrated in the TABLE in FIG. 3 will cause a shift between four forward speed ratios in various modes and a reverse speed ratio. In FIG. 3, the sign o indicates that a particular frictional device is activated or engaged. If the particular friction device is a clutch or a brake, the above-mentioned sign o indicates the engagement of the clutch or brake, while if the particular friction device is a one-way clutch, the sign o indicates activation of the one-way clutch. The reference numerals 2A, 3R, and 4A arranged in a row below the reference numeral B/B indicate a second speed apply chamber 2A, a third speed release chamber 3R and a fourth speed apply chamber 4A of a hydraulic pressure operated servomotor for tightening the band brake B/B. The reference sign o indicates supply of hydraulic fluid pressure to a particular chamber. The reference characters $\alpha_1$ (alpha one) and $\alpha_2$ (alpha two) express a ratio of number of teeth of the sun gear $S_1$ to number of teeth of the ring gear $R_1$, and a ratio of number of teeth of the sun gear $S_2$ to number of teeth of the ring gear $R_2$, respectively. A gear ratio is a ratio of rotational speed of the input shaft 26 to rotational speed of the output shaft 30.

Figure 4:
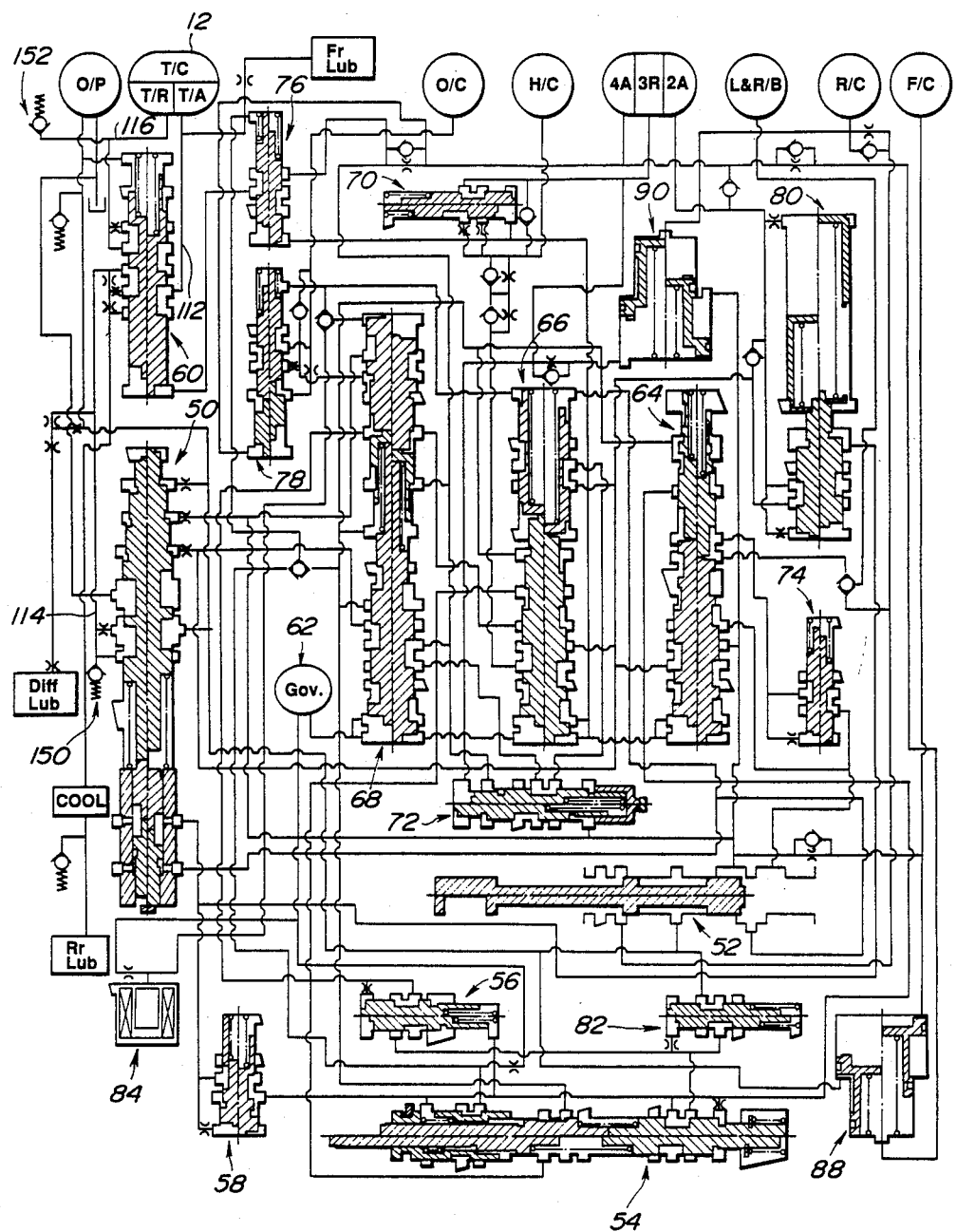
FIG. 4 is a hydraulic circuit of the hydraulic control system for the automatic transmission.

Owing to the change speed operation by the planetary gear box 14, rotating the input shaft 26 at a rotational speed causes the output shaft 30 to rotate at a rotational speed decreased or increased from the rotational speed of the input shaft 26. Torque of the output shaft 30 is transmitted via an output gear 32, idler gear 34, reduction gear 36 to the ring gear 38 of the differential unit 16. This causes the drive axles 40 and 42 to drive the left and right front wheels 40 and 42. As a result, an automatic shift among four forward speed ratios including an overdrive can be effected. FIG. 4 shows a hydraulic circuit of a hydraulic control system for controlling the above-mentioned power train.

This hydraulic control system comprises the following valves: a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a manual first range pressure reduction valve 74, a vehicle speed cutoff valve 76, an overrun clutch control valve 78, a 1-2 accumulator valve 80, a kickdown modifier valve 82, an overdrive inhibitor solenoid 84, a N-D accumulator 88, and a servo release accumulator 90. These valves are operatively interconnected as illustrated in FIG. 4. They are connected also to an oil pump O/P, the apply chamber T/A and the release chamber T/R of the torque converter 12, the clutches R/C, H/C, O/C, and F/C, the brake L&R/B, and three chambers 2A, 3R, and 4A of the band brake B/B as illustrated in FIG. 4. Owing to this circuit structure, the appropriate one or the appropriate combination of the clutches R/C, H/C, O/C, and F/C, and the brakes L&R/B and B/B which are to be engaged is selected in response to vehicle speed and opening degree of the engine throttle. In this disclosure, such valves which are not directly concerned with the present invention are not specifically described. The following explanation proceeds along FIG. 1 which illustrates such valves and portions, extracted from the whole system, which have close connection with the present invention in order to make it easy to understand the present invention.

Figure 1:
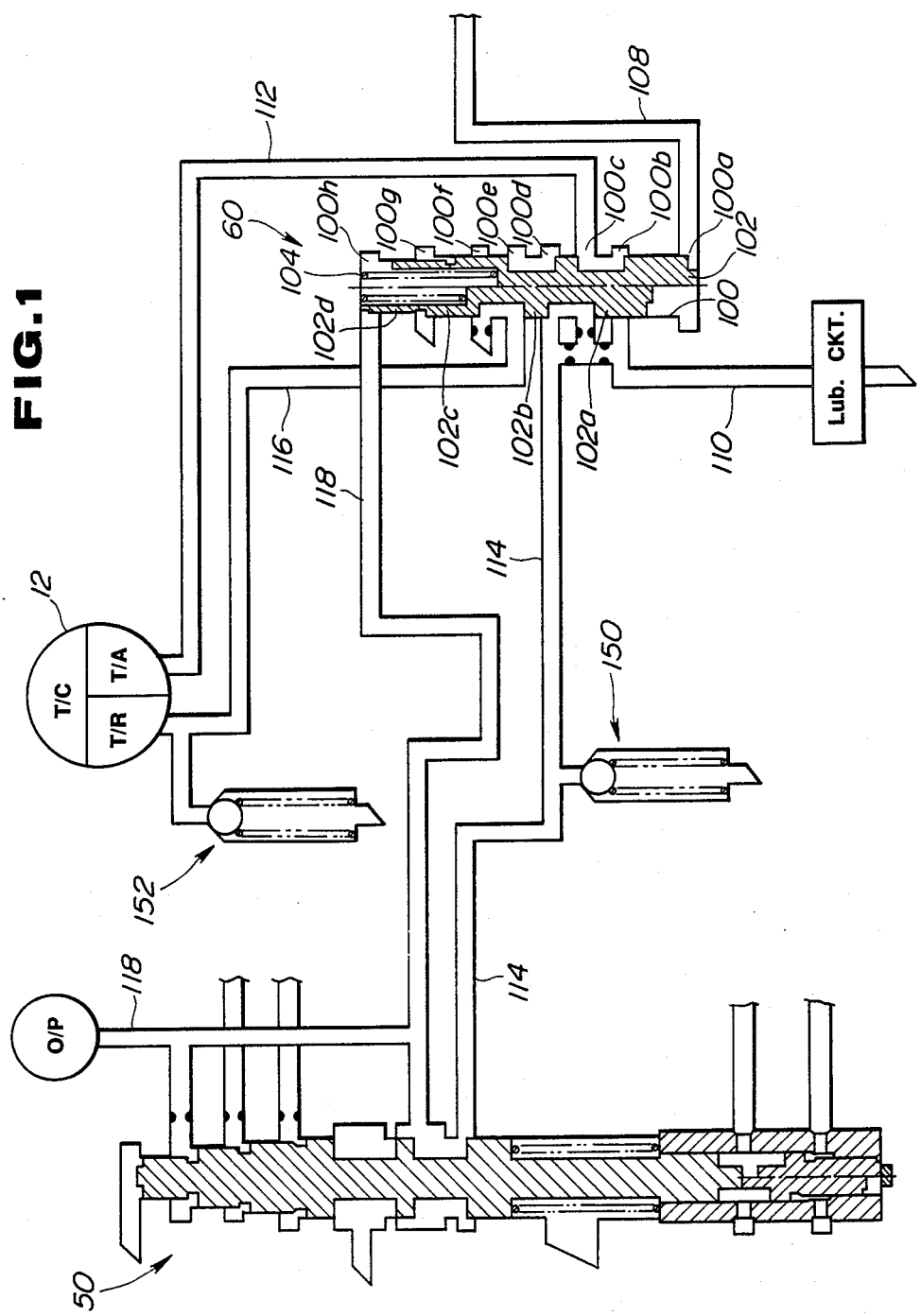
FIG. 1 is a circuit diagram of a portion of a hydraulic control system for an automatic transmission showing a preferred embodiment of a hydraulic system for a torque converter according to the present invention.

As shown in FIG. 1, the lock-up control valve 60 comprises a spool 102 slidably inserted into a valve bore 100 and a spring 104 biasing the spool 102 down as viewed in FIG. 1. The valve bore 100 is provided with various ports 100a to 100h. The spool 102 has various lands 102a to 102d. Among them, the lands 102a, 102b, and 102c have the same diameter, while the other land 102d has a diameter smaller than the above-mentioned three lands. The relationship, in position, of various lands and ports is set as illustrated. The port 100a is connected to a hydraulic line 108 which a lock-up clutch command indicative hydraulic pressure is supplied to. The 100b is connected to a hydraulic line 110 provided for lubrication. The port 100c is connected to a hydraulic line 112 communicating with an apply chamber T/A within the torque converter 12. The port 100d is connected to a hydraulic line 114 which a torque converter supply pressure is supplied to from the pressure regulator valve 50. The port 100e is connected to a hydraulic line 116 connected to a release chamber T/R within the torque converter 12. The hydraulic line 116 is provided with a second or secondary relief valve 152 which is designed to prevent the pressure of the hydraulic fluid within the hydraulic line 116 from increasing above a second predetermined value. The hydraulic line 112 and hydraulic line 114 are connected to the hydraulic line 110 through orifices in order to assure supply of lubricating hydraulic fluid even when the lock-up clutch 24 is engaged. The ports 100f and 100g are drain ports, respectively. The port 100h is connected to a hydraulic line 118 which a line pressure is supplied to from the pressure regulator valve 50. The relationship between a pressure acting area formed on the land 102a of the spool 102, a pressure acting area formed on the land 102d, and the force of the spring 104 is set as follows. That is, when the port 100a is pressurized with a hydraulic pressure above a predetermined value, the spool 102 is shifted to a position (lock-up clutch engagement side position) as indicated by the left half thereof as viewed in FIG. 1 since the pressure acting area formed on the land 102a is exposed to this hydraulic pressure. However, the spool 102 stays in a position (lock-up clutch release side position) as indicated by the right half thereof as viewed in FIG. 1 in the other cases.

The pressure regulator valve 50 has a function to adjust the pressure of hydraulic fluid discharged by the oil pump O/P and supplied to the hydraulic line 118. Upon performing this function, the pressure regulator valve 50 discharges a portion of hydraulic fluid to the hydraulic line 114. Provided in this hydraulic line 114 is a first relief valve 150 which is designed to prevent the pressure of hydraulic fluid in the hydraulic line 114 from increasing above a first predetermined value.

The operation of this embodiment is described.

In the absence of a lock-up clutch engagement command, i.e., when the lock-up clutch 24 is to be released, the lock-up engagement command hydraulic pressure signal is not supplied to the hydraulic line 108 and thus there is no hydraulic pressure therein. Thus, the spool 102 of the lock-up control valve 60 takes the position as indicated by the right half thereof as viewed in FIG. 1 owing to the bias action of the spring 104 allowing the port 100e to communicate with the port 100d and the port 100c to communicate with the port 100b. This causes the hydraulic line 114 to be connected to the hydraulic line 116, and the hydraulic line 112 to be connected to the hydraulic line 110. Therefore, the torque converter supply pressure supplied by the pressure regulator valve 50 to the hydraulic line 114 is supplied to the release chamber T/R of the torque converter 12 via the hydraulic line 116. At the same time, the hydraulic fluid is discharged from the apply chamber T/A of the torque converter 12 to the lubrication circuit via the hydraulic lines 112 and 110. As a result, the hydraulic fluid flows from the release chamber T/R to the apply chamber T/A within the torque converter 12, releasing the lock-up clutch 24. In this case, the hydraulic pressure within the torque converter 12 is limited to the second predetermined value set by the second relief valve 152. Paying attention to the flow of hydraulic fluid, the supply of hydraulic fluid to the release chamber T/R of the torque converter 12 is effected through the hydraulic line 114, via the lock-up control valve 60, and through the hydraulic line 116, while the discharge of hydraulic fluid from the apply chamber T/A is effected through the hydraulic line 112, via the lock-up control valve 60, and through the hydraulic line 110. Since the second predetermined value set by the second relief valve 152 is not higher than the first predetermined value set by the first relief valve 150, the hydraulic pressure within the torque converter 12 is kept at this relatively low second predetermined value. The setting is made such that the second predetermined value falls in a range of pressure values allowed within the torque converter 12 when the lock-up clutch 24 is released.

In the presence of the lock-up clutch engagement command, i.e., when the lock-up clutch 24 is to be engaged, the lock-up clutch engagement command hydraulic pressure signal is supplied to the hydraulic line 108. This causes the spool 102 of the lock-up control valve 60 to be shifted to the position as indicated by the left half thereof as viewed in FIG. 1. This allows the port 100d to communicate with the port 100c, and the port 100e to communicate with the port 100f. The hydraulic line 114 is now allowed to communicate with the hydraulic line 112, while the hydraulic line 116 is allowed to communicate with the drain port 100f. As a result, the torque converter supply pressure within the hydraulic line 114 is supplied to the apply chamber T/A via the hydraulic line 112, whereas the hydraulic fluid is discharged from the release chamber T/R. This results in the engagement of the lock-up clutch 24 with an engagement force variable in proportion to the magnitude of hydraulic pressure within the apply chamber T/A. Paying attention to the flow of hydraulic fluid, the supply of hydraulic fluid to the apply chamber T/A is effected through the hydraulic line 114, via the lock-up control valve 60, and through the hydraulic line 112, while the discharge of hydraulic fluid from the release chamber T/R is effected through the hydraulic line 116. Since the first or primary relief valve 150 is provided in the hydraulic line 114, the hydraulic pressure within the apply chamber T/A is kept at the first predetermined value set by the first or primary relief valve 150. The setting is made such that this first predetermined value falls in a range of pressure values allowed within the torque converter 12 when the lock-up clutch 24 is engaged. The structural rigidity of the torque converter 12 increases when the lock-up clutch 24 is engaged, the first predetermined valve set at a value higher than the second predetermined value. Since the torque transmission capacity of the lock-up clutch 24 is determined by this first predetermined value, the torque transmission capacity of the lock-up clutch 24 has been increased by an amount corresponding to the difference between the first and second predetermined values.

Although, in the embodiment shown in FIG. 1, the first or primary relief valve 150 is provided in the hydraulic line 114, this relief valve may be provided in the hydraulic line 112.

What is claimed is:

1. A hydraulic control system for a torque converter with a lock-up clutch, an apply chamber, and a release chamber, which chambers being defined by the lock-up clutch within the torque converter, the hydraulic control system comprising:
    a lock-up clutch release circuit which is opened in response to an absence of a lock-up clutch engagement demand, allowing supply of hydraulic fluid to the release chamber within the torque converter and discharge of hydraulic fluid from the apply chamber within the torque converter;
    a lock-up clutch engagement circuit, including a drain port, which is opened in response to the lock-up clutch engagement demand, allowing supply of hydraulic fluid to the apply chamber within the torque converter and discharge of hydraulic fluid from the release chamber;
    a first relief valve means for preventing the pressure of the hydraulic fluid within said lock-up clutch engagement circuit from increasing above a first maximum predetermined value; and
    a second relief valve means for preventing the pressure of the hydraulic fluid within said lock-up clutch release circuit from increasing above a second predetermined maximum value;
    the setting being such that said first predetermined value is higher than said second predetermined value.

2. In a hydraulic control system for an automatic transmission drivingly connected to a torque converter with a lock-up clutch therein, the lock-up clutch defining an apply chamber and a release chamber within the torque converter:
    a lock-up clutch release circuit including a pressure regulator valve, a lock-up control valve, and the torque converter, the lock-up clutch release circuit being opened in response to the absence of a lock-up clutch engagement demand, allowing supply of hydraulic fluid from the pressure regulator valve to the release chamber within the torque converter via the lock-up control valve and discharge of hydraulic fluid from the apply chamber within the torque converter;
    a lock-up clutch engagement circuit including the pressure regulator valve, the lock-up control valve, and the torque converter, the lock-up clutch engagement circuit being opened in response to the presence of said lock-up clutch engagement demand, allowing supply of hydraulic fluid from the pressure regulator valve to the apply chamber within the torque converter via the lock-up control valve and discharge of hydraulic fluid from the release chamber within the torque converter;
    a first relief valve communicating with said lock-up release and engagement circuits at a portion between the pressure regulator valve and the lock-up control valve; and
    a second relief valve communicating with said lock-up clutch release and engagement circuits at a portion between the lock-up control valve and the torque converter.

3. In a hydraulic control system:
    a torque converter with an apply chamber and a release chamber defined therein;
    means for defining a first hydraulic fluid line having one end communicating with said apply chamber of said torque converter and also having an opposite end;
    means for defining a second hydraulic fluid line having one end communicating with said release chamber of said torque converter and also having an opposite end;
    a pressure regulator valve means for discharging a hydraulic fluid;
    means for defining a third hydraulic fluid line having one end connected to said pressure regulator valve means for receiving said hydraulic fluid and also having an opposite end;
    a lubrication circuit;
    means for defining a fourth hydraulic fluid line having one end and an opposite end connected to said lubrication circuit;
    a lock-up control valve having a drain port and a spool movable between a first position in which said opposite end of said third hydraulic fluid line is allowed to communicate with said opposite end of said second hydraulic fluid line and said opposite end of said second hydraulic fluid line is allowed to communicate with said one end of said fourth hydraulic fluid line, and a second position in which said opposite end of said third hydraulic fluid line is allowed to communicate with said opposite end of said first hydraulic fluid line and said opposite end of said second hydraulic fluid line is isolated from said opposite end of said third hydraulic fluid line and allowed to communicate with said drain port;
    a first pressure relief valve communicating with said third hydraulic fluid line;
    a second pressure relief valve communicating with said second hydraulic fluid line.

4. A hydraulic control system as claimed in claim 3, wherein said first pressure relief valve allows drainage of the hydraulic fluid from said third hydraulic fluid line when a hydraulic fluid pressure within said third hydraulic fluid line exceeds a first predetermined value, and said second relief valve allows drainage of the hydraulic fluid from said second hydraulic fluid line when the hydraulic fluid pressure within said second hydraulic fluid line exceeds a second predetermined value which is higher than said first predetermined value.

* * * * *